United States Patent [19]

Washiashi et al.

[11] Patent Number: 4,907,792
[45] Date of Patent: Mar. 13, 1990

[54] SHEET GUIDE ADJUSTING APPARATUS

[75] Inventors: Morimasa Washiashi; Toshio Koike, both of Tokyo, Japan

[73] Assignee: Iwatsu Electric Company, Ltd., Suginami, Tokyo, Japan

[21] Appl. No.: 254,967

[22] Filed: Oct. 7, 1988

[30] Foreign Application Priority Data

Oct. 23, 1987 [JP] Japan .......................... 62-161404[U]

[51] Int. Cl.$^4$ .............................................. B65H 9/04
[52] U.S. Cl. .................................. 271/240; 271/253; 271/171
[58] Field of Search ............... 271/171, 223, 224, 240, 271/253, 254

[56] References Cited

FOREIGN PATENT DOCUMENTS 57-23739, 6/1982 Japan .
21231 12/1984 Japan ................................. 271/171
55-028 3/1986 Japan .................................. 271/171

Primary Examiner—Richard A. Schacher
Attorney, Agent, or Firm—Paul & Paul

[57] ABSTRACT

A sheet guide adjusting apparatus for copy machines, phototelegraphic apparatuses, photo-engraving machines and the like, comprises a pair of sliding members supported on a machine body and able to move in a reciprocal manner to apply guides to the edges of sheets, and a drive mechanism mounted on the machine body and able to move in a reciprocal manner between and operatively interconnecting the sliding members. One of the sliding members and the drive mechanism being provided with clamping devices for clamping the sliding member and the drive mechanism in relative to the machine body, whereby the guides can be positioned to match the size of sheets by a center-standard method when the drive mechanism is fixed in a stable position in relation to the machine body, and the guides can be positioned to match the size of sheets by an edge-standard method when one of the sliding members is fixed in a stable position in relation to the machine body.

6 Claims, 4 Drawing Sheets

SHEET GUIDE ADJUSTING APPARATUS

BACKGROUND OF THE INVENTION (1) Field of the Invention

The present invention relates to a sheet guide adjusting apparatus to be used for conveying sheet materials such as original, e.g., documents, etc., or copies thereof in copy machines, phototelegraphic apparatuse, photo-engraving machines, and the like.

(2) Description of the Related Art

In conventional copy machines, phototelegraphic apparatuses and photo-engraving machines etc., when sheet materials such as original or copies are conveyed therethrough, the sheet materials are guided by keeping the edges thereof in contact with guides, and if a different size sheet material is to be conveyed, the guides are moved to the required positions to accommodate the different size of the sheet materials.

Various ways of adjusting the position of the guides are known; for example, the center-standard method in which the positions of the guides are adjusted on the basis of a center point of the sheet to be conveyed. In this method, a shaft fixed to the center of a machine body is provided with a pinion rotating therearound, a pair of racks having guides, which are in contact with both edges of the sheet, are arranged on both sides of the pinion, and are moved together or apart by the rotation of the pinion in such a manner that the positions of both guides can be adjusted as desired.

In a modification of this center-standard method, a pair of sliding members having guides are fixed to a wire suspended on a plurality of rollers and freely movable, whereby the reciprocal motion of one of the sliding members is transferred to the other sliding member via the wire, and thus the pair of sliding members are moved together or apart in such a manner that the positions of both guides can be adjusted as desired.

Another known method is the edge-standard method, in which the positions of the guides are adjusted on the basis of one side edge of the sheet. In this method, a fixed guide is provided on one side of the machine body and a sliding member having a sliding guide fixed thereto is arranged on the other side of the machine body, and the distance between the fixed guide and the sliding guide is adjusted by moving the sliding member.

As described above, in the conventional sheet guide adjusting apparatuses, positioning the guides to match the size of the sheet is conducted only according to the center-standard method or to the edge-standard method, and a sheet guide adjusting apparatus in which both the center-standard method and the edge-standard method can be conducted is yet to be disclosed. To enable both of the above methods to be conducted in one apparatus, two of the third type of apparatuses mentioned above are arranged on both sides of the machine body and the respective sliding members are moved individually, whereby the distance between both sliding members can be adjusted as desired.

SUMMARY OF THE INVENTION

In view of the problems described above, an object of the present invention is to provide a sheet guide adjusting apparatus in which the positions of the guides can be adjusted to match the size of sheets easily and securey, by using both the center-standard method and the edge-standard method of moving one of the sliding members.

According to the present invention, there is provided a sheet guide adjusting apparatus comprising a machine body, a pair of sliding members supported on the machine body and able to move in a reciprocal manner and having guides which are applied to the respective edges of sheets, and a drive means mounted on the machine body and able to move in a reciprocal-manner between and operatively interconnecting the pair of sliding members, one of the pair of sliding members and the drive means being provided with a clamping means for clamping the sliding member and the drive means in relation to the machine body.

According to a preferred embodiment of the present invention, the drive means operatively interconnecting the pair of sliding members comprises racks provided on the respective sliding members, and a pinion supported on the machine body and able to move in a reciprocal manner while meshing with the racks.

According to another preferred embodiment of the present invention, the drive means comprises rollers, a wire suspended on the rollers and fixed to the sliding members, and a wire-roller frame mounted on the machine body and able to move in a reciprocal manner while carrying the rollers and the wire.

According to a further preferred embodiment of the present invention, the clamping means for clamping the drive means in relation to the machine body comprises a notch formed on a sliding piece fitted to the pinion, and a wedge mounted on the machine body and able to move in a reciprocal manner and engage with the notch.

In the apparatus according to the present invention, if the user intends to adjust the guides by the center-standard method, the drive means is clamped in relation to the machine body by the clamping means and one of the sliding members is moved, whereby the other sliding member is also moved by the drive means, and thus the pair of sliding members are moved together or apart. Accordingly, the distance between both guides is adjusted and made to match the size of the sheet.

Conversely, if the user intends to adjust the guides by the edge-standard method, the clamping means is removed from the drive means and one of the sliding members is clamped in relation to the machine body by the clamping means of the sliding member, and then the other of the sliding members is moved, whereby the latter sliding member is moved together or apart, in conjunction with the drive means, in relation to the sliding member clamped to the machine body. Accordingly, the distance between both guides is adjusted to match the size of the sheet on the basis of the position of the guide of the clamped sliding member.

BRIEF DESCRIPTION OF THE DRAWINGS

FIG. 7 is a schematic view of the embodiment shown in FIG. 4, wherein the guide is adjusted by the edge-standard method; and, FIGS. 8 and 9 are schematic views of a second embodiment of the present invention, wherein

DESCRIPTION OF THE PREFERRED EMBODIMENTS

To clarify the differences between the present invention and the conventional apparatus, the conventional guide position adjusting method will be first described hereinafter, with reference to FIGS. 1 to 3.

Figure 1:
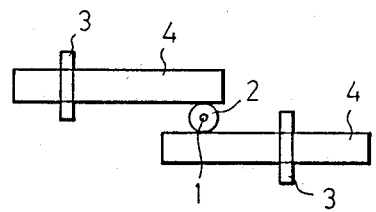
FIG. 1 is a schematic view showing an example of the conventional center-standard guide adjusting method.

FIG. 1 shows an example of the center-standard method, in which the positions of the guides are adjusted on the basis of the center of the sheet. In this method, a shaft 1 is fixed to the center of a machine body and is provided with a pinion 2 rotating therearound, and a pair of racks 4, 4 having guides 3, 3 which are applied to both edges of the sheet are arranged on both sides of the pinion 2, whereby the pair of racks 4, 4 are moved together or apart by the rotation of the pinion 2, and thus the positions of the guides 3, 3 can be adjusted as desired.

Figure 2:
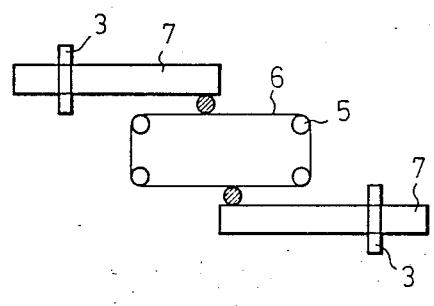
FIG. 2 is a schematic view showing another example of the conventional center-standard guide adjusting method.

FIG. 2 also shows an example of the center-standard method. In this example, a pair of sliding members 7, 7 having guides 3, 3 are fixed to a wire 6 suspended on a plurality of rollers 5 and freely movable thereon, whereby a reciprocal motion of one of the sliding members 7 is transferred to the other sliding member 7 via the wire 6, whereby the pair of sliding members 7 are moved together or apart, and thus the positions of both sliding members 7 can be adjusted as desired.

Figure 3:
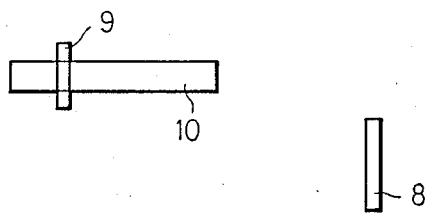
FIG. 3 is a schematic view showing an example of the conventional edge-standard guide adjusting method.
Figure 4:
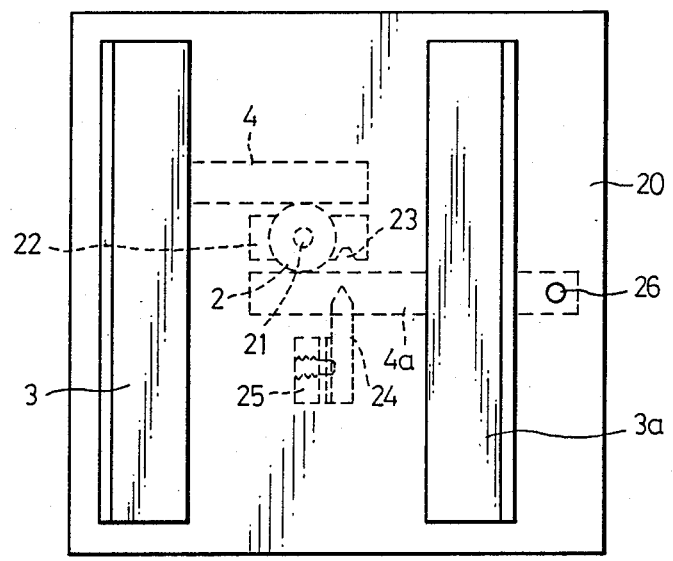
FIG. 4 is a plan view of a first embodiment of the present invention.
Figure 5:
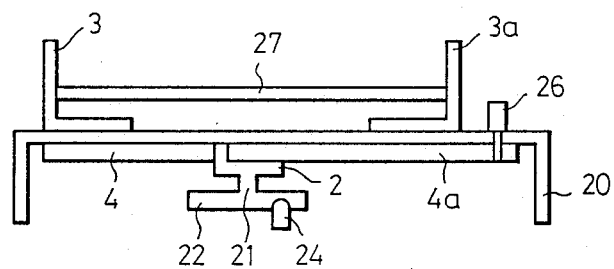
FIG. 5 is a elevational view of the first embodiment shown in FIG. 4.

FIG. 3 shows an example of the edge-standard method, in which the positions of the guides are adjusted on the basis of one edge of the sheet. In this method, a fixed guide 8 is provided on one side of the machine body and a sliding member 10 having a sliding guide 9 fixed thereto is arranged on the other side of the machine body, whereby the distance between the fixed guide 8 and the sliding guide 9 is adjusted by moving the sliding member 10

The preferred embodiments of the present invention will be now described hereinafter.

Figure 6:
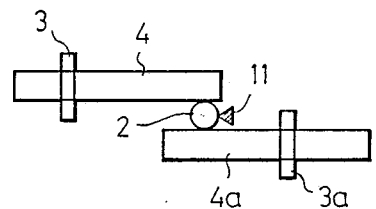
FIG. 6 is a schematic view of the embodiment shown in FIG. 4, wherein the guide is adjusted by the center-standard method.
Figure 7:
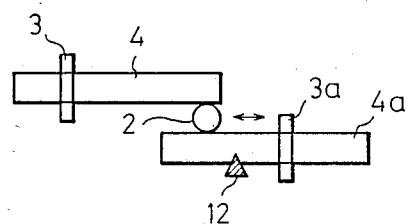

FIGS. 4 to 7 show a first embodiment of the present invention, and an outline of the first embodiment will now be given with reference to FIGS. 6 and 7.

The principal part of the embodiment comprises a pair of racks 4 and 4a having guides 3 and 3a, which are applied to the edges of a sheet, and able to move in a reciprocal manner in relation to a machine body, a pinion 2 is located between the racks 4 and 4a, to mesh therewith, and is mounted on the machine body and able to move in a reciprocal manner in relation thereto. A clamping means 11 is provided for clamping the pinion 2 at a required position in relation to the machine body, and a clamping means 12 is provided for clamping the rack 4a at a stable position in relation to the machine body.

To adjust the positions of the guides 3 and 3a by the center-standard method, the pinion 2 is clamped at the required position in relation to the machine body by the clamping means 11, and when the rack 4 is moved, the movement of the rack 4 is transferred to the other rack 4a via the pinion 2 rotating at the required position, and thus the pair of racks 4 and 4a are moved together or apart for an equal distance. Accordingly, the distance between the guides 3 and 3a fitted on the rack 4, 4a is adjusted, and thus the positions of the guides are adjusted by the center-standard method on the basis of the axis of the pinion 2, i.e., the center line of the sheet.

Conversely, to adjust the positions of the guides 3 and 3a by the edge-center method, the clamping means 11 is released and the pinion 2 is then free to move in a reciprocal manner, but the rack 4a is clamped in relation to the machine body by the clamping means 12. In this condition, when the rack 4 is moved, the pinion 2 is also moved to rotate together with the rack 4, and thus the guide 3 fitted on the movable rack 4 is moved toward or away from the guide 3a fitted on the fixed rack 4a. Accordingly, the positions of the guides are adjusted by the edge-standard method on the basis of the guide 3a fixed in the stable position. A concrete construction of the embodiment will be described hereinafter with reference to FIGS. 4 and 5.

In the Figures, numeral 20 designates an original carrier (a part of the machine body), on which a pair of guides 3 and 3a are mounted in such a manner that they are able to move to the left and right along the guide members (not shown) provided on the original carrier 20. The guides 3 and 3a are fixed to racks 4 and 4a, respectively, which mesh with a common pinion 2 arranged therebetween. The pinion 2 is mounted on a pinion shaft 21 and is rotatable therearound, and the pinion shaft 21 is fixed at the lower end thereof to a sliding member 22. The sliding member 22 is provided with a notch 23 and is mounted on the original carrier 20, and is able to move to the left and right along a guide member (not shown) provided on the original carrier 20. A wedge 24 is guided along a wedge frame (not shown) fixed to the original carrier 20, and is able to move forward and backward to engage and disengage the notch 23 of the sliding member 22. The wedge 24 is retained in two positions, i.e., when engaged with and when disengaged from the sliding member 22, by a ball stop 25.

Further, a clamping screw 26 is provided at the outer end of the rack 4a to fix the rack 4a, and thus the guide 3a, at a predetermined position on the original carrier 20 by screwing the clamping screw 26 into the original carrier 20. Numeral 27 designates an original or copy paper.

In the operation of the embodiment described above, when the guides 3 and 3a are adjusted by the center-standard method, the guides 3 and 3a are moved left and right to the required positions, and the wedge 24 is engaged with the notch 23 of the sliding member 22, so that the pinion 2 is immovably clamped in relation to the original carriers 20. In this condition, when one guide 3 is moved together with the rack 4 to the left or right, the other rack 4a and guide 3a are moved by an equal amount symmetrically therewith, whereby both of the guides 3 and 3a are adjusted by the center-standard method on the basis of the shaft 21 of the pinion 2, i e., the center line of the original or copy paper 27.

Conversely, when the guides 3 and 3a are adjusted by the edge-standard method, the wedge 24 is disengaged from the notch 23 of the sliding member 22, and one side rack 4a is clamped in the desired position in relation to the original carrier 20 by the clamping screw 26. Then, when the guide 3 is moved, both the rack 4 and the pinion 2 are moved, so that the guide 3 is moved toward or away from the clamped guide 3a. Accordingly, the guides are adjusted by the edge-standard method on the basis of the guide 3a. In this case, the guides 3 and 3a can be easily positioned at the standard edge by adjusting the clamped position of the guide 3a by the clamping screw 26.

Figure 8:
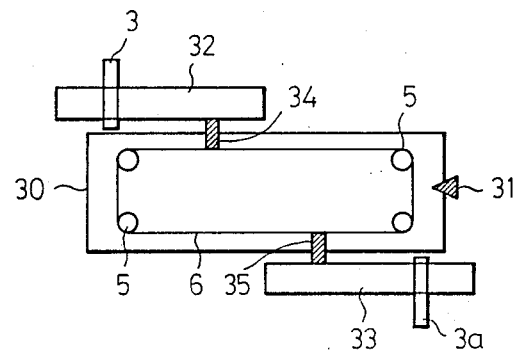
FIG. 8 shows the guide adjustment according to the center-standard method and FIG. 9 shows the guide adjustment according to the edge-standard method.
Figure 9:
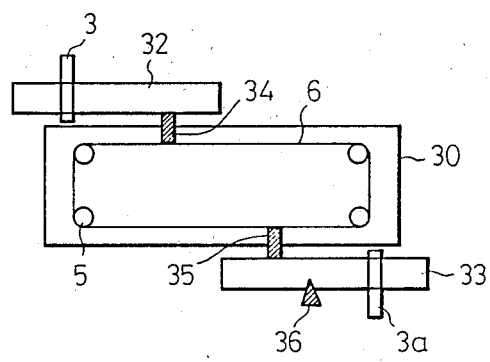

A second embodiment of the present invention is illustrated in FIGS. 8 and 9.

In this second embodiment, the combination of the racks and pinion as the drive means for moving both of the guides 3 and 3a in the first embodiment, is replaced by a wire and rollers drive means.

This drive means comprises four rollers 5, a wire 6 suspended on the rollers 5, and a wire-roller frame 30 carrying the rollers 5 and the wire 6. The wire-roller frame 30 can be clamped in position in relation to the original carrier by a clamping means 31.

A pair of sliding members 32 and 33 having guides 3 and 3a are fixed to the wire 6 by fixing means 34 and 35. Further, one sliding member 33 can be clamped in position in relation to the original carrier by a clamping means 36.

The operation of the second embodiment described above is similar to that of the first embodiment. Namely, when the wire-roller frame 30 is clamped in position in relation to the original carrier by the clamping means 31, the positions of the guides 32, 33 are adjusted by the center-standard method, and conversely, when the wire-roller frame 30 is made movable by releasing the clamping means 31 and the sliding member 33 is clamped in position in relation to the original carrier by the clamping means 36, the positions of the guides are adjusted by the edge-standard method, on the basis of the clamped guide 3a.

According to the present invention, the guides can be adjusted by both the center-standard method and the edge-standard method, as a very simple operation involving only the moving of one of the guides.

When the rack-pinion mechanism is employed as the drive means, it is not necessary to separate the meshing of the racks and the pinion when changing from the center-standard method to the edge-standard method, and thus the problem of remeshing the racks and the pinion is avoided. Also, it is possible to reduce the size of the module of the pinion, and thus an inexpensive and high-precision apparatus can be obtained.

Further, according to the present invention, it is possible to apply a wire and rollers drive means when adjusting the guides by the edge-standard method, which was hitherto impossible, and thus a sheet guide adjusting apparatus employing drive a wire and rollers drive means and able to utilize both the center-standard method and the edge-standard method can be realized.

We claim:

1. A sheet guide adjusting apparatus comprising: a machine body; a pair of sliding members supported on said machine body and able to move in a reciprocal manner, said sliding members having guides which are applied respectively to edges of sheets; a drive means mounted on said machine body and able to move in a reciprocal manner between and operatively interconnecting said pair of sliding members; one of said pair of sliding members and said drive means being provided, respectively, with clamping means for clamping said sliding member and said drive means in relation to said machine body.

2. An apparatus according to claim 1, wherein said drive means comprises racks formed on said sliding members, and a pinion mounted on said machine body and meshing with said racks.

3. An apparatus according to claim 2, wherein said pinion is provided with a sliding member capable of moving in a reciprocal manner in relation to the machine body.

4. An apparatus according to claim 2, wherein said clamping means of said drive means comprises a notch formed on said sliding member of said pinion, and a wedge mounted on said machine body and able to move in a reciprocal manner and engage with said notch.

5. An apparatus according to claim 1, wherein said drive means comprises rollers, a wire suspended around said rollers and fixed to said pair of sliding members, and a wire-roller frame mounted on said machine body and able to move in a reciprocal manner while carrying said rollers and said wire.

6. An apparatus according to claim 1, wherein said clamping means for said sliding member is a clamping screw mounted on said sliding member.

* * * * *